(No Model.)
W. F. SMITH.
PEA HULLER.
No. 412,005. Patented Oct. 1, 1889.
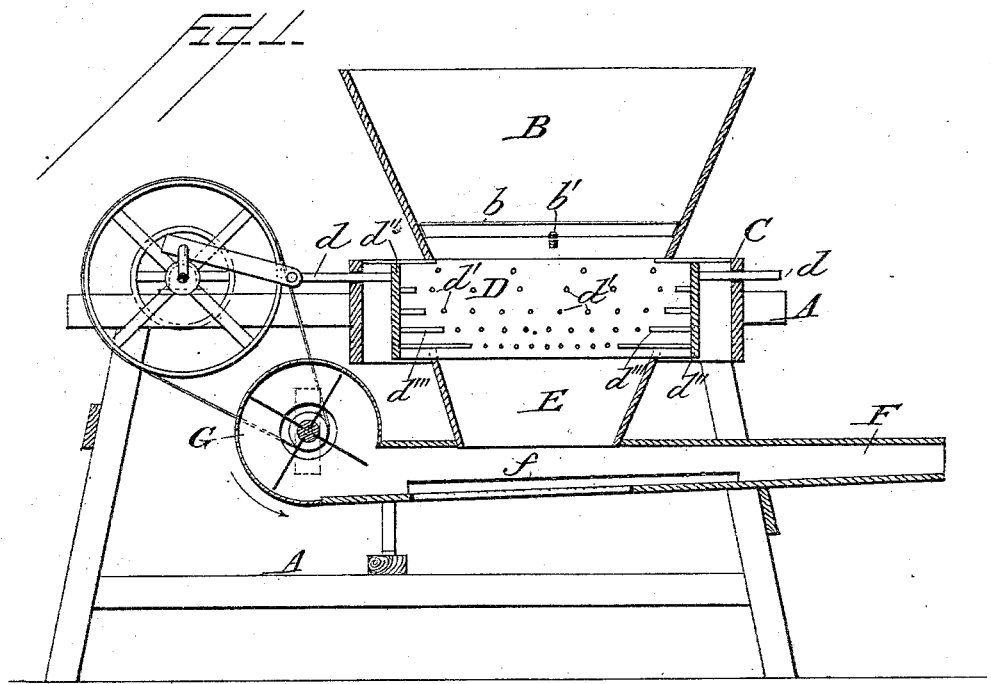
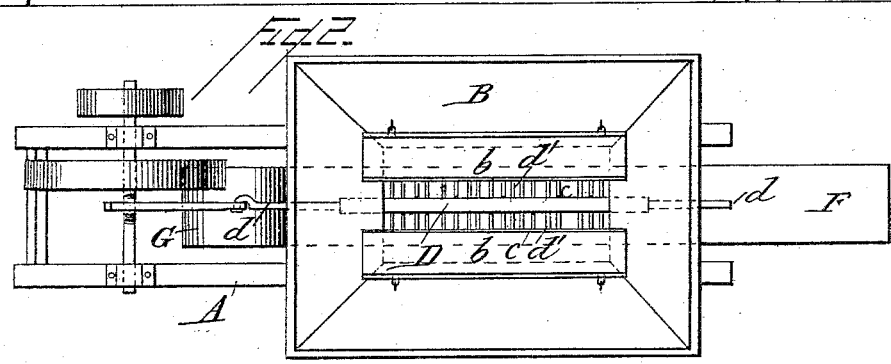
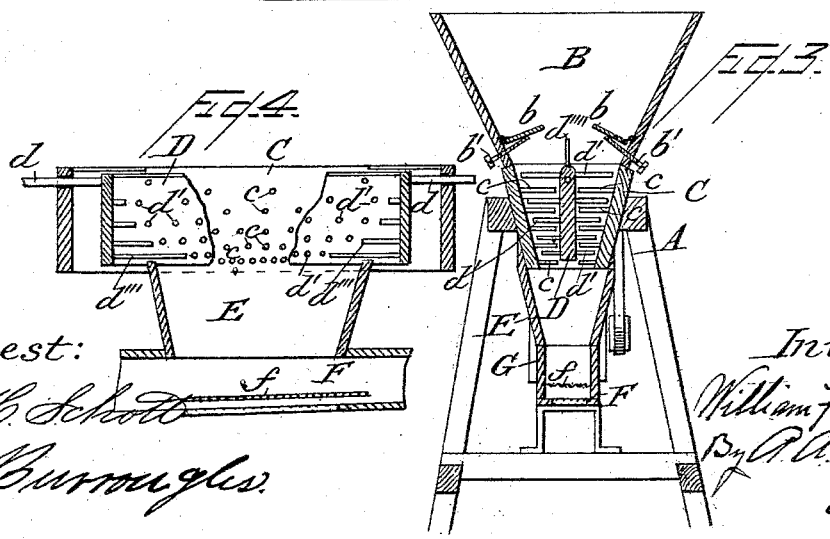
Attest:
F. H. Schott
G. W. Burroughs
Inventor:
William F. Smith
By A. A. Wood
Atty

UNITED STATES PATENT OFFICE.

WILLIAM FURLOW SMITH, OF HOLTON, GEORGIA.

PEA-HULLER.

SPECIFICATION forming part of Letters Patent No. 412,005, dated October 1, 1889.

Application filed October 13, 1888. Serial No. 288,015. (No model.)

*To all whom it may concern:*

Be it known that I, WILLIAM FURLOW SMITH, of Holton, in the county of Bibb and State of Georgia, and a citizen of the United States of America, have invented certain new and useful Improvements in Pea-Hullers; and I do hereby declare the following to be a full, clear, and exact description of the invention, such as will enable others skilled in the art to which it appertains to make and use the same, reference being had to the accompanying drawings, and to figures or letters of reference marked thereon, which form a part of this specification.

This invention relates to improvements in machinery for hulling or thrashing peas and other leguminous seeds, having for its object the supplying of a machine that will remove the entire contents of the pods without injuring the product by cracking or bruising the same, as is often the case in machines of this class as heretofore used.

The invention consists of means for breaking the pods and of separating the same from the seeds, the details of which will be hereinafter fully set forth, and the parts thought to be new pointed out in the claim.

In the accompanying drawings, Figure 1 is a longitudinal section. Fig. 2 is a plan view. Fig. 3 is a cross-section. Fig. 4 is a longitudinal section of the plunger and closing-chamber.

In the figures like reference-marks indicate corresponding parts in the several views.

A is the supporting-frame, and B the hopper, both of which may be of any desired construction compatible with its functions. The hopper B is secured in any desired manner to the breaker-chamber C, the opening from said hopper into said chamber being preferably adjusted by the leaves $b$, if in any way, said leaves being operated to open or close the said opening by the screws $b'$, which pass through the sides of the hopper at a point below the leaves $b$ and at an angle at which they will bear upon said leaves.

In the central part of the breaker-chamber C is the reciprocating plunger D, which is guided by the rods $d$, one of which is connected to the mechanism for reciprocating said plunger D, preferably as shown, which is by a crank and pitman. In the top edge of the plunger D are the teeth $d''''$, if desired, for the purpose of agitating the mass in the hopper, and in each side of said plunger are the teeth $d'$, which are set closer together in each row as the rows are nearer the bottom edge of the plunger, and the rows are also closer together, both for reasons that will be hereinafter set forth. The pieces $d''$, which correspond in shape on their edges to the shape of the breaker-chamber with which they come in contact, are fastened to each end of the plunger D, as shown in Figs. 2 and 3, and have on the inner sides of each of them the pieces $d'''$, which prevent any pods from working through without coming in contact with the breakers and from dropping outside of the flue E, and at the same time break all pods with which they come in contact in the same way as the pins.

The sides of the breaker-chamber are provided with rows of teeth $c$, which pass between the rows of teeth in the plunger D, each row being set thicker with spikes as the rows approach the bottom. A great advantage is gained by having these teeth so set both in the plunger D and in the sides of the breaker-chamber—namely, the pods before breaking will readily enter between the spikes in the top rows, which rows will, by the reciprocation of the plunger, break the long pods into pieces short enough to allow them to proceed down through the machine, which process will be continued until the pods and seeds are separated. From the foregoing it will be readily seen that the pods will enter readily, but that no whole pod will pass through the machine by any possible chance. The teeth $d'$ and $c$ may be set in any number of rows and as closely together in such rows as may be found desirable, as the pods of some leguminous plants require to be broken much finer before they will separate from the seeds than others.

As soon as the operation of completely breaking the pods and freeing the seeds shall have taken place the broken pods and seeds will drop by gravity through the flue E into the blast-flue F, where the same will be separated, the seeds dropping through the screen $f$, and the broken pods being blown out by the blast from the fan G that passes through this flue.

The screen $f$ may be raised above the bottom of flue F, if desired.

Any system of pulleys and belting may be used to drive the fan and reciprocate the plunger; hence I do not confine myself to the specific manner shown.

Having thus described my invention, what I claim as new, and desire to secure by Letters Patent of the United States, is—

In a pea-huller, breaking mechanism consisting of the reciprocating plunger D, having teeth $d'$, and actuating mechanism, and the chamber C, provided with teeth $c$, said teeth $d'$ and $c$ being nearer to each other in the rows and the rows closer together as they approach the bottom of the said plunger and chamber, substantially as shown and described, and for the purpose specified.

In testimony whereof I hereunto affix my signature in presence of two witnesses.

WILLIAM FURLOW SMITH.

Witnesses:
J. MORGAN,
HUGH M. WILLET.